(12) United States Patent
Schwager et al.

(10) Patent No.: US 9,391,677 B2
(45) Date of Patent: Jul. 12, 2016

(54) COMMUNICATIONS DEVICE AND METHOD FOR TRANSMITTING AT LEAST TWO PARALLEL TRANSMIT SIGNALS

(71) Applicant: SONY CORPORATION, Tokyo (JP)

(72) Inventors: Andreas Schwager, Waiblingen (DE); Daniel Schneider, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/431,102

(22) PCT Filed: Oct. 1, 2013

(86) PCT No.: PCT/EP2013/002941
§ 371 (c)(1),
(2) Date: Mar. 25, 2015

(87) PCT Pub. No.: WO2014/056584
PCT Pub. Date: Apr. 17, 2014

(65) Prior Publication Data
US 2015/0236761 A1    Aug. 20, 2015

(30) Foreign Application Priority Data

Oct. 12, 2012    (EP) .................................... 12007094

(51) Int. Cl.
*H04B 3/00*    (2006.01)
*H04L 25/00*    (2006.01)
(Continued)

(52) U.S. Cl.
CPC .................. *H04B 7/043* (2013.01); *H04B 3/54* (2013.01); *H04B 7/0478* (2013.01); *H04B 7/0482* (2013.01)

(58) Field of Classification Search
CPC .... H04B 7/043; H04B 7/0478; H04B 7/0482; H04B 3/54
USPC ......... 375/257, 219, 285, 296, 346, 267, 299, 375/347
See application file for complete search history.

(56) References Cited

U.S. PATENT DOCUMENTS

| | | |
|---|---|---|
| 8,660,196 B2 | 2/2014 | Schwager et al. |
| 2003/0185309 A1 | 10/2003 | Pautler et al. |
| 2011/0280188 A1 | 11/2011 | Jeon et al. |

(Continued)

FOREIGN PATENT DOCUMENTS

| | | |
|---|---|---|
| EP | 2 061 160 | 5/2009 |
| WO | 2011 017247 | 2/2011 |

OTHER PUBLICATIONS

U.S. Appl. No. 14/767,207, filed Aug. 11, 2015, Schneider, et al.

(Continued)

*Primary Examiner* — Phuong Phu
(74) *Attorney, Agent, or Firm* — Oblon, McClelland, Maier & Neustadt, L.L.P.

(57) ABSTRACT

A communications device is provided including a transmitter unit configured to transmit at least two transmit signals via a transmission channel; a precoder unit configured to beamform the transmit signals based on a precode matrix that is adapted to reduce a signal level at at least one location in an area of the transmission channel; and an amplifier adapted to amplify at least one of the transmit signals to a value that results in a signal level at the at least one location that is below a predetermined signal level. A corresponding method for transmitting at least two parallel transmit signals is provided as well.

16 Claims, 9 Drawing Sheets

(51) Int. Cl.
*H04B 7/04* (2006.01)
*H04B 3/54* (2006.01)

(56) References Cited

U.S. PATENT DOCUMENTS

| | | | |
|---|---|---|---|
| 2011/0293024 A1 | 12/2011 | Torres Canton et al. | |
| 2012/0257683 A1 | 10/2012 | Schwager et al. | |
| 2013/0163685 A1* | 6/2013 | Yonge, III .............. | H04B 3/542 375/257 |

OTHER PUBLICATIONS

"HomePlug AV2 Technology. Raising the Bar for Sustained High-Throughput Performance and Interoperability for Multi-stream Networking Using Existing Powerline Wiring in the Home." HomePlug AV2 whitepaper, V1.0, (2012), pp. 1-11.

International Search Report Issued Feb. 4, 2014 in PCT/EP2013/002941 Filed Oct. 1, 2013.

* cited by examiner

COMMUNICATIONS DEVICE AND METHOD FOR TRANSMITTING AT LEAST TWO PARALLEL TRANSMIT SIGNALS

BACKGROUND

1. Field of the Disclosure

The present disclosure relates to a communications device and a method for transmitting at least two parallel transmit signals via a transmission channel.

1. Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Multiple-input multiple-output (MIMO) and multiple-input single-output communications systems (MISO) use beamforming for increasing bandwidth and to enhance the signal-to-noise ratio at a receiving device. There is a need to optimize data throughput in MIMO and MISO communications systems while fulfilling regulatory limits for electromagnetic interference (EMI).

SUMMARY

A communications device is provided including a transmitter unit configured to transmit at least two transmit signals via a transmission channel; a precoder unit configured to beamform the transmit signals based on a precode matrix that is adapted to reduce a signal level at at least one location in an area of the transmission channel; and an amplifier adapted to amplify at least one of the transmit signals to a value that results in a signal level at the at least one location that is below a predetermined signal level.

Further, a method for transmitting at least two transmit signals via a transmission channel is provided, including beamforming the at least two transmit signals based on a precode matrix that reduces a signal level at at least one location in an area of transmission channel; and amplifying at least one of the transmit signals to a value that results in a signal level at the at least one location that is below a predetermined signal level.

The foregoing paragraphs have been provided by way of general introduction, and are not intended to limit the scope of the following claims. The described embodiments, together with further advantages, will be best understood by reference to the following detailed description taken in conjunction with the accompanying drawings. The elements of the drawings are not necessarily to scale relative to each other.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
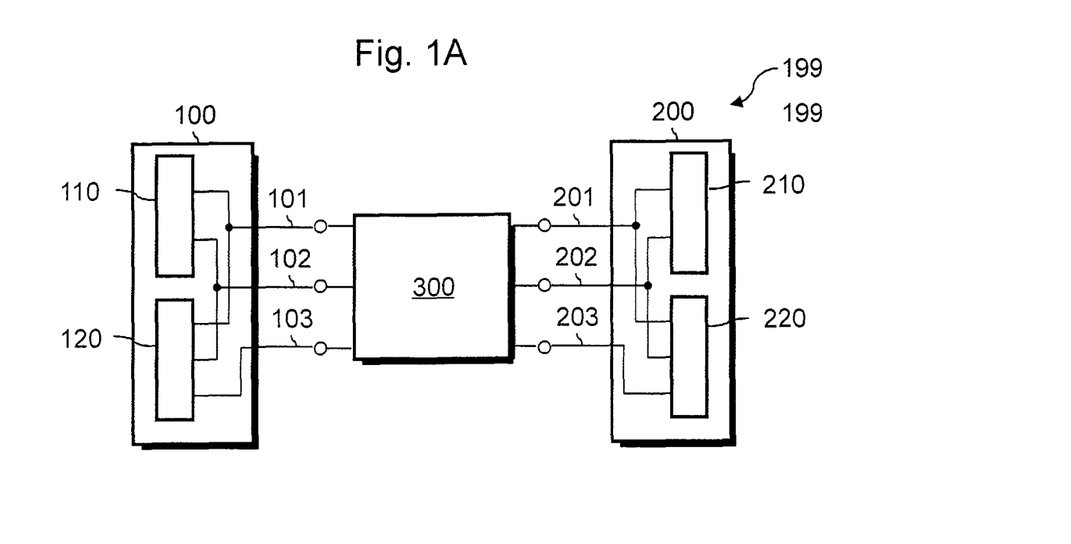
FIG. 1A is a schematic block diagram illustrating a wired MIMO communications system with a receiver unit integrated in a first communications device and a transmitter unit integrated in a second communications device in accordance with an embodiment of the disclosure.

Referring now to the drawings, wherein like reference numerals designate identical or corresponding parts throughout the several views, in FIG. 1A a communications system 199 according to an embodiment of the disclosure is depicted.

The communications system 199 may be a wireless or a wired communications system, for example xDSL (generic Digital Subscriber Line) or WiFi (IEEE 802.11n). According to an embodiment, the communications system 199 is based on an OFDM (Orthogonal Frequency Division Multiplexing) modulation scheme. In accordance with another embodiment, the communications system 199 is a system using power distribution wires for data communication. For example, the communications system 199 is a power line communications (PLC), mains communications, power line telecommunications (PLT), modulated carrier superimposed to the 50 or 60 Hz alternating current of the power lines respectively.

The communications system 199 is a MIMO system with a first communications device 100, which includes a transmitter unit 110 employing one, two or more transmit ports 101-102, and a second communications device 200, which includes a receiver unit 220 employing at least one, for example two, three or four, receive ports 201-203. A transmission channel 300 connects the transmitter unit 110 and the receiver unit 220.

The first communications device 100 may be an exclusively transmitting device with transmit ports 101-102 only. According to other embodiments, the first communication device 100 is a bidirectional device including, in addition to the transmitter unit 110, a receiver unit 120 which may be of the type of the receiver unit 220 in the second communications device 200, wherein the ports 101-102 may be bidirectional ports and the first communications device 100 may comprise a further receive port 103. The second communications device 200 may be an exclusively receiving device. According to other embodiments, the second communications device 200 is a bidirectional device including, in addition to the receiver unit 220, a transmitter unit 210 which may be of the type of the transmitter unit 110 in the first communications device 100, wherein the ports 201-202 may be bidirectional ports. The communications devices 100, 200 may be stand-alone devices or may be integrated in an electronic device for consumer applications, for example a storage unit, a television set, an audio receiver, or a video recorder.

The transmission channel 300 may be multi-wire connection. In accordance with an embodiment the transmission channel is a power cable containing two or more electrical conductors used for transmission of AC (alternating current) electric power and installed as permanent wiring within buildings or buried in the ground. A plurality of m transmit signals $t_x$ define a transmit vector $t_m$ and a plurality of n receive signals $r_y$ define a receive vector $r_n$. For example, the transmitter unit 110 may supply two differential transmit signals $t_x$ using the live or phase wire (L, P), the neutral wire (N), and protective earth (PE), wherein the differential transmit signals $t_x$ are modulated on a carrier superposing the AC frequency of the mains voltage. According to an embodiment, the receiver unit 220 receives three differential receive signals between live wire and neutral wire, between neutral wire and protective earth, and between live wire and protective earth. According to another embodiment, the receiver unit 220 may receive the three differential receive signals and a common mode signal resulting from a leakage current from the wiring as a fourth receive signal.

In a real transmission channel 300 the transmit signals $t_x$ interfere with each other, for example through capacitive coupling between the wires. In a channel matrix $H_{n,m}$, which describes the receive vector $r_r$, as a function of the transmit vector $t_m$, the entries of each line describe one of the receive signals $r_y$ in dependence of all transmit signals $t_x$, wherein typically none of the entries $h_{i,j}$ of $H_{n,m}$ is equal 0 when crosstalk occurs.

$$r_n = H_{n,m} t_m \quad (1)$$

For enhancing the signal-to-noise ratio (SNR) the principle of beamforming provides a decoupling of the receive signals by precoding the transmit vector with a precode matrix $P_{m,m}$ such that from the resulting equivalent channel matrix $H_{n,m} P_{m,m}$ and a decoding scheme at the receiver side, a diagonal matrix can be obtained, where each receive signal depends on only one single transmit signal.

For example, the second communications device 200 may comprise a channel estimator unit for determining the channel matrix $H_{n,m}$ describing the channel state information (CSI) of the transmission channel 300 by comparing a received training symbol sequence with a nominal training symbol sequence. Then singular value decomposition of $H_{n,m}$ may be used to obtain the precode Matrix $P_{m,m}$ As shown in equation (2), singular value decomposition (SVD) decomposes the channel matrix $H_{n,m}$ in a first unitary marix $U_{n,n}$, the Hermitian transpose $V_{m,m}^H$ of a second unitary matrix $V_{m,m}$ and a diagonal matrix $D_{n,m}$, wherein the diagonal entries of $D_{n,m}$ are the singular values of the channel matrix $H_{n,m}$.

$$H_{n,m} = U_{n,n} D_{n,m} V_{m,m}^H \quad (2)$$

The second communications device 200 transmits feedback information containing information describing the channel matrix $H_{n,m}$ or the second unitary matrix $V_{m,m}$ to the first communications device 100. The feedback information may be transmitted via the transmission channel 300 or via an alternative transmission path. The first communications device 100 may comprise a control unit configured to generate the precode matrix on the basis of the feedback information. For example, the control unit uses the second unitary matrix $V_{m,m}$ as precode matrix. Then equation (3) describes the receive vector $r_n$, which the receiver unit 220 receives:

$$r_n = H_{n,m} V_{m,m} t_m \quad (3)$$

In equation (3) the channel matrix $H_{n,m}$ may be replaced by its SVD description in equation (2):

$$r_n = U_{n,n} D_{n,m} V_{n,m}^H V_{m,m} t_m \quad (4)$$

The product of a unitary matrix and its Hermitian transpose is the identity matrix. Decoding the receive vector using the Hermitian transpose $U_{n,n}^H$ of the first unitary matrix $U_{n,n}$ results in a decoded receive vector $y_n$ $$y_n = U_{n,n}^H U_{n,n} D_{n,m} V_{m,m}^H V_{m,m} t_m \quad (5)$$

$$y_n = D_{n,m} t_m \quad (6)$$

With regard to the decoded receive vector $y_n$, the transmission channel 300 is decomposed into a set of parallel and independent paths.

Typically, the described precoding/decoding scheme uses beamforming for decomposition of interfering signals in order to increase a signal-to-noise ratio of payload data. Embodiments of the disciosureuse beamforming for reducing interfering signal levels at defined locations in an area of the transmission channel.

The area of the transmission channel might be a part of a power line communications system, for instance, so that the locations at which the interfering signal levels are reduced are predefined locations at the wires of the power line communications system or at particular outlets of the power line communications system. At those locations or outlets the interfering signal level is reduced in order to reduce electromagnetic interference (EMI) e.g. to radio reception.

However, the area of the transmission channel might in one embodiment surround the power line communications system, e.g. the location might be located outside a building in which the wires of the power line communications system are installed. This might ensure that a signal level at the location of antennas outside of the building is within limits allowed by EMI regulations.

Embodiments of the disclosuremay in one embodiment apply the beamforming precoding/decoding scheme not only for the transmission of payload data but also for the transmission of synchronization data and training symbols.

Figure 1B:
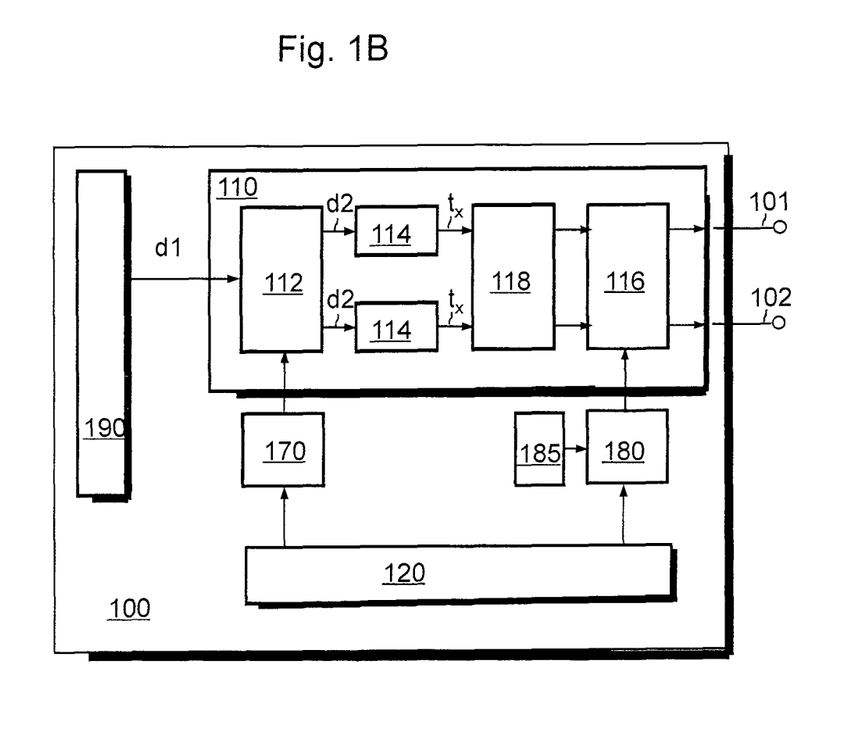
FIG. 1B is a schematic block diagram illustrating the transmitter unit of FIG. 1A according to an embodiment.

FIG. 1B shows in more detail an example of a communications device 100 with a transmitter unit 110 as illustrated in FIG. 1A. A first control unit 190 may output a data stream d1 including payload data to the transmitter unit 110. The data stream may or may not contain training symbols. The transmitter until 110 includes a serial-to-parallel multiplexer 112 which may split or multiply the data stream d1 into a number M of parallel data streams and which may add synchronization data, for example a synchronization sequence, for each of the M data streams. The number M of data streams is equal to or less than the minimum of the number m of transmit ports and the number n of receive ports, $M \leq \min[n, m]$. For example in a system with two transmit ports and three receiving ports, the number M of data streams is equal one or equal two. A MISO system using one receive port uses only one data stream.

The serial-to-parallel multiplexer 112 outputs M data streams d2, which may include a synchronization sequence and either training symbols or payload data or both respectively. The serial-to-parallel multiplexer 112 may be programmable with respect to the synchronization sequence and/or the number of training symbols.

For example, the communications device 100 may include a second control unit 170 which receives feedback information from other communications devices participating in the same communications system and which may program or configure the serial-to-parallel multiplexer 112 in accordance with the received feedback information such that only as many training symbols as actually required are inserted into the transmit data streams and/or such that the synchronization sequence is only as long as required. The second control unit 170 may receive information for determining the current synchronization data via a receiver unit 120 as illustrated in FIG. 1A or via an alternate transmission path.

Each of the data streams d2 is transmitted to one of M modulators 114 respectively. The modulators 114 may be quadrature amplitude modulators (QAM) and each modulator 114 generates a modulated data transmit signal $t_x$.

In accordance with other embodiments, training symbols or the synchronization sequence or both may be inserted in an appropriate form after modulation of the data signals d2.

A precoder unit 116 precodes (beamforms) the modulated data signals $t_x$ according to a beamforming scheme as discussed above to generate the precoded transmit signals. The precoder unit 116 may be characterized by coefficients derived from a precode matrix. The precoder unit 116 may be programmable to realize different precode matrices. For example, during a learning phase, the precode matrix may be the identity matrix such that the precoder unit 116 is transparent for the modulated data signals $t_x$. During an operational phase, the precode matrix $P_{m,m}$ may approximately be equal to the second unitary matrix $V_{m,m}$.

The precoder unit 116 is adapted to beamform the transmit signals based on the precode matrix that is adapted to reduce a signal level at at least one location in an area of the transmission channel.

In accordance with an embodiment, the precode matrix $P_{m,M}$ is defined to eliminate the precoded transmit signals at predefined locations. The dimensions of the precode matrix $P_{m,M}$ might vary with the number of transmitted streams M. If M=1, the precode matrix simplifies to a precode vector. Throughout this description and claims the term matrix may also refer to the special case of a vector. Since a communications system includes a plurality of transmission channels at different frequencies, the elimination of certain transmit signals may in one embodiment have an equivalent result to using a frequency notch filter. A precoder control unit 180 in the first communications device 100 may receive information for determining the precode matrix, for example via the receiver unit 120 as illustrated in FIG. 1A, and may be used to configure the precoder unit 116. According to an embodiment, the precoder control unit 180 selects for each channel or for different time slots one of a plurality of predefined matrices stored in a storage unit 185.

In another embodiment, the precoder unit 116 is adapted to reduce emitted radiation power as the signal level.

According to another embodiment the precoder unit 116 is adapted to reduce interfering noise level at any location on a mains grid as signal level.

The transmitter unit 110 further includes an amplifier 118 adapted to amplify at least one of the transmit signals to a value that results in an (interfering) signal level at the at least one location that is below a predetermined signal level. The amplifier 118 is located between the modulators 114 and the precoder unit 116. Since the amplifier 118 acts on the transmit streams provided by the modulators 114, it is also possible that the amplifier 118 is formed by two separate amplifiers each amplifying independently one of the transmit streams (not depicted).

Figure 1C:
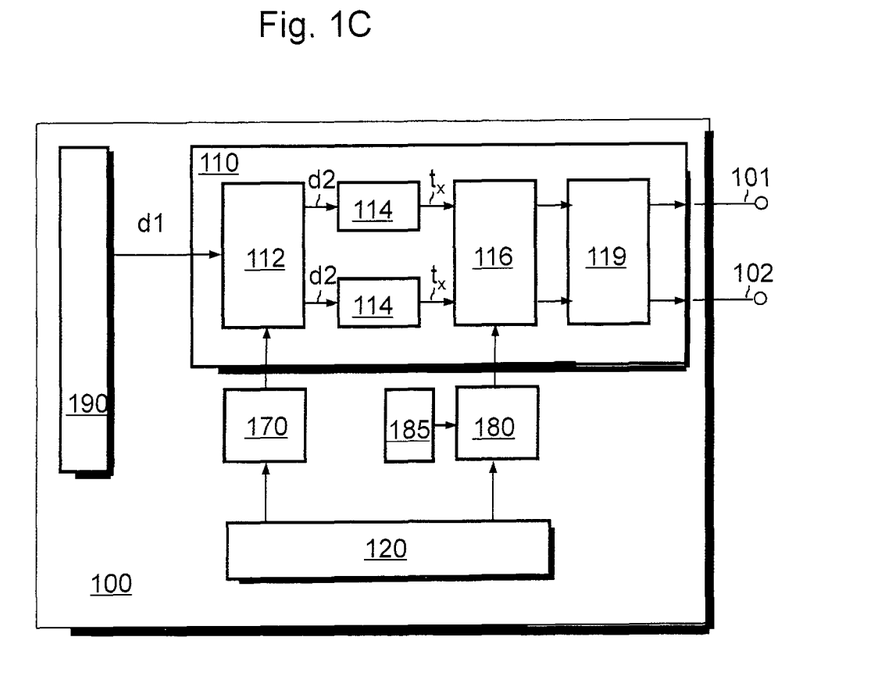
FIG. 1C is a schematic block diagram illustrating the transmitter unit of FIG. 1A according to a further embodiment.

In FIG. 1C a further embodiment of the transmitter unit 110 is depicted with an amplifier 119 located between the precoder unit 116 and the output ports. Also in this embodiment, the amplifier 119 is adapted to amplify at least one of the transmit signals to a value that results in an (interfering) signal level at the at least one location that is below a predetermined radiation level.

Since both locations of the amplifiers 118, 119 as depicted in FIGS. 1B and 1C embody the disclosure, the term "transmit signal" on which the amplifiers 118, 119 work should be understood to include the transmit streams between the modulators 114 and the precoder unit 116 in FIG. 1B as well as the output signals of the precoder unit 116 in FIG. 1C.

The predetermined radiation level might be a level that is given by regulations to fulfil EMI requirements.

In an embodiment, the amplifier 118, 119 amplifies the signal level by an amount which corresponds to or is less than a reduction of the signal level at the location caused by the precoding, or corresponds to or is less than a signal level specified by a regulation minus the reduced signal level, or the smaller of both.

The amplification of the amplifier 118, 119 is larger than an amplification when "normal" precoding without reduction of signal levels is used.

Hence, beamforming is, according to embodiments of the disclosure, not or not only used to improve data throughput of a transmission. There are more properties where Beamforming benefit PLC technologies:

Beamforming may improve interference (EMI) from PLC by eliminating signals at some locations, Beamforming may reduce the electrical or magnetical field of the radiated signals in the air, Beamforming may reduce the interference level at any location at the mains grid where an interfered device is connected to the mains grid.

If the interference level is improved as described before, the modems transmission level might be enhanced in a way to have equivalent EMI potential. The loss of throughput rates due to the beamforming being optimized for EMI (instead for data throughput) may be balanced with the gain of increased feeding levels.

Figure 1D:
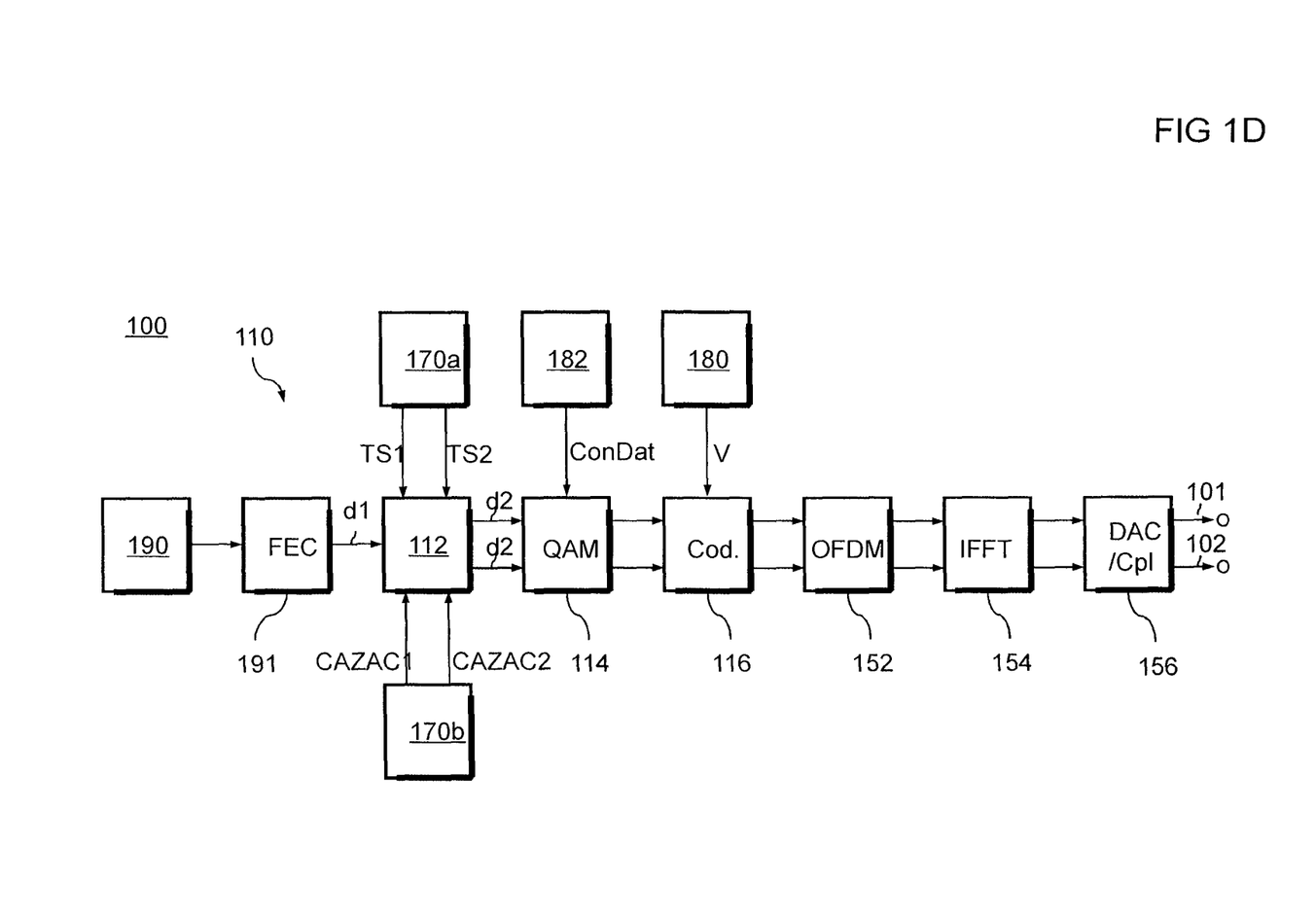
FIG. 1D is a schematic block diagram illustrating details of a transmitter unit in accordance with another embodiment referring to beamforming in the frequency domain.

FIG. 1D refers to an embodiment where the transmitter unit 110 of a communications device 100 provides beamforming in the frequency domain. A data source, for example a first controlling unit 190, outputs a primary data stream, which contains payload data but neither training symbols nor synchronization sequences. An FEC (forward error correction) unit 191 inserts code redundancy according to an error detection scheme for facilitating error correction at the receiver side and outputs a first data stream d1. A multiplexer unit 112 may split up the first data stream d1 into at least two complementary data streams d2 or multiplies, at least doubles, the data stream in two or more identical data streams d2.

A modulator unit 114 modulates each data stream d2, for example by using a plurality of sub-carriers carriers and QAM (quadrature amplitude modulation), respectively. The modulator unit 114 may use constellation data ConDat describing frequency dependent channel characteristics for adapting the QAM scheme accordingly. A constellation control unit 182 may derive the constellation data ConDat from feedback information which may be received, for example, via a receiver unit as described with regard to FIGS. 1A and 1B.

According to an embodiment, the multiplexer unit 112 inserts in each of its output data streams d2 training symbols TS1, TS2 or synchronization sequences CAZAC1, CAZAC2 or both. According to another embodiment, the modulator unit 114 inserts in each of its output data streams training symbols or synchronization sequences or both in an appropriate form. The number of training symbols TS1, TS2 and synchronization sequences CAZAC1, CAZAC2 may vary for each output data stream d2 under control of second control unit 170 that may include a first sub-unit 170a assigned to the training symbols and a second sub-unit 170b assigned to the synchronization sequences. The second control unit 170 may receive information for determining the currently required synchronization sequence and/or number of training symbols for each output data stream d2 via the receiver unit 120 as illustrated in FIG. 1A or via an alternative transmission path. According to other embodiments, the second control unit 170 includes only one of the sub-units 170a, 170b.

A precoder unit 116 precodes the modulated data signals using a precode matrix V received by a precoder control unit 180 that may provide the precode matrix V on the basis of further feedback information received, for example, via the receiver unit, too. The modulated data signals contain payload data, training symbols or synchronisation sequences such that beamforming includes beamforming of the training symbols, the synchronisation sequences or payload data or any combination thereof. A further modulator unit 152 of the transmitter unit 110 may modulate the precoded (beamformed) modulated data signals on a frequency carrier using OFDM (orthogonal frequency division modulation. A mixer and inverse Fourier transformation unit 154 combines the orthogonal signals and performs an inverse Fourier transformation for obtaining digital output signals describing the transmit signals in the time domain. A converter and coupling unit 156 converts the digital output signals in analogue transmit signals and couples each analogue transmit signal to a corresponding transmit port 101, 102.

Figure 1E:
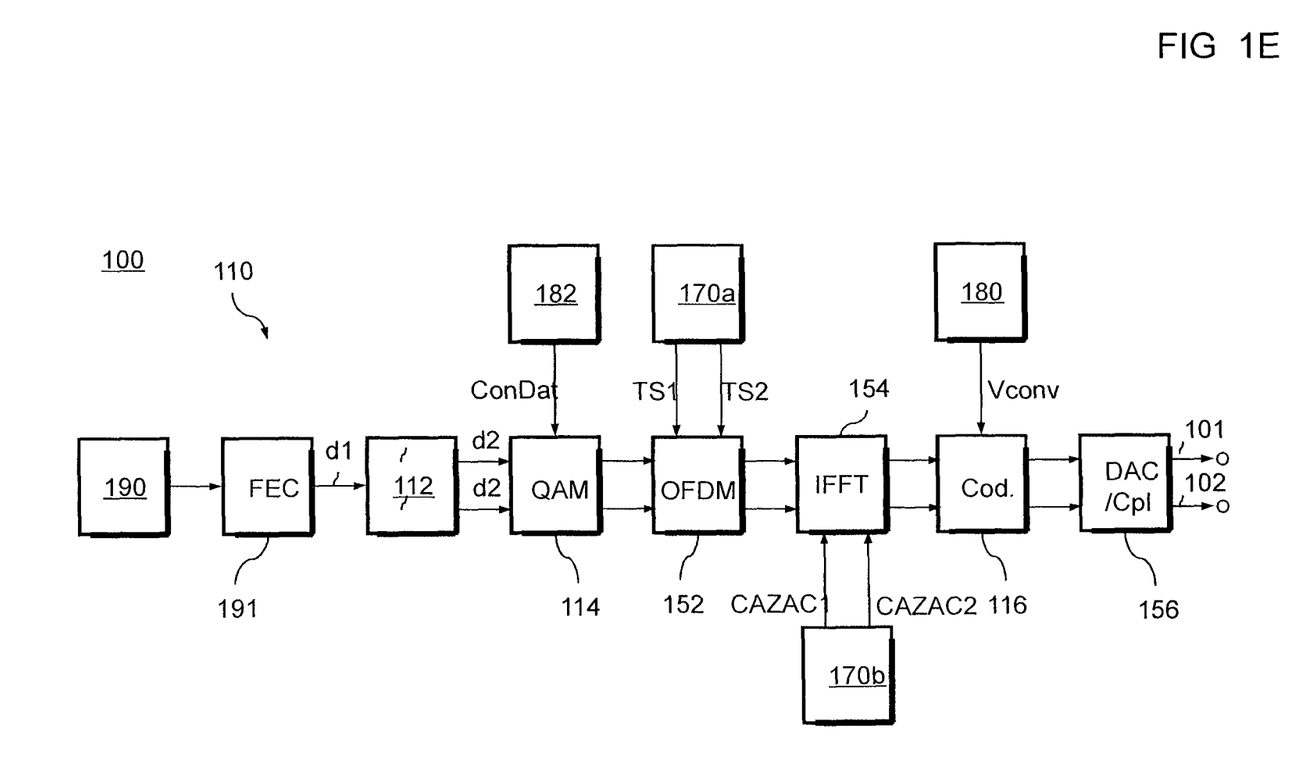
FIG. 1E is a scheniatic block diagram illustrating details of a LI ansrnitter unit in accordance with a further embodiment referring to beamforming in the time domain.

FIG. 1E refers to an embodiment where the transmitter unit 110 of a communications device 100 provides beamforming in the time domain. According to this embodiment, the transmitter unit 110 provides two transmit signals. In accordance with other embodiments, the transmitter unit 110 may provide more transmit signals, for example three, four or more.

The precoder unit 116 may be provided between the mixer and inverse Fourier transformation unit 154 and the converer and coupling unit 156. The precoder control unit 180 provides a time domain precode matrix Vconv, which may be derived from a frequency domain precode matrix by convolution.

The training symbols TS1, TS2 and synchronization sequences CAZAC1, CAZAC2 may be inserted at the multiplexer unit 112 as described above with reference to FIG. 1D. According to the illustrated embodiment, the second modulation unit 152 inserts the training symbols TS1, TS2 into the respective data stream before performing the modulation in each branch respectively under control of the first sub-unit 170a. According to other embodiments, the number of branches may be not equal two and the number of training symbols may be equal to that of the branches. According to a further embodiment, the mixer and inverse Fourier transformation unit 154 inserts the synchronization sequences CAZAC1, CAZAC2 into the respective data stream under control of the second sub-unit 170b of the second control unit 170 before the orthogonal signals are generated. Again, the number of synchronization sequences may correspond to that of the branches.

Figure 2A:
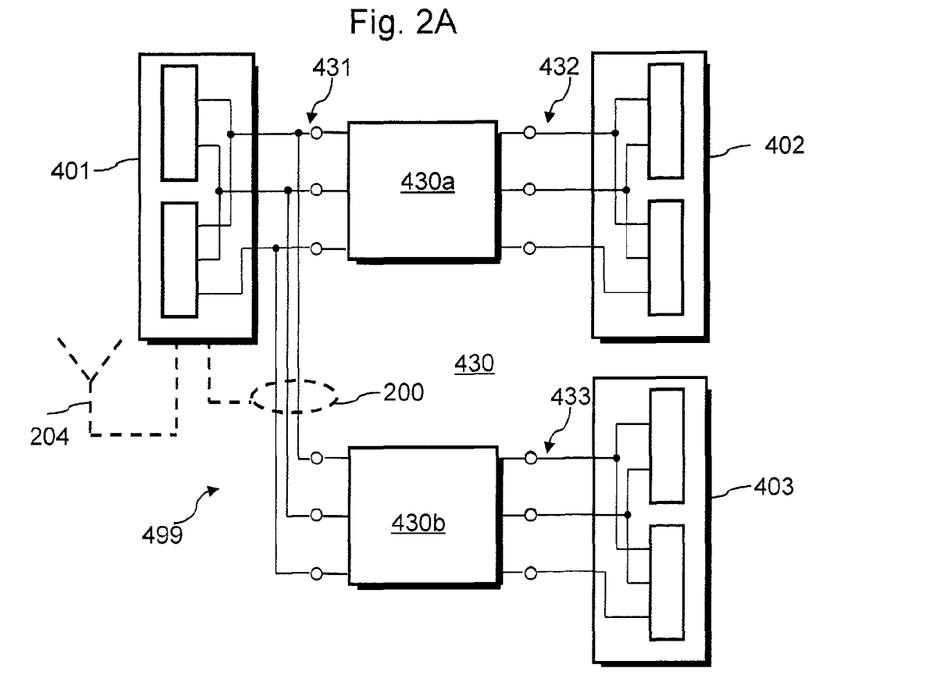
FIG. 2A is a schematic block diagram illustrating a MIMO communications system using an in-house electric power wiring according to another embodiment in a first state in which a temporarily connected communications device is connected to an outlet of the in-house wiring.

FIG. 2A shows a communications system 499 in a first state. The communications system 499 includes a first and a second communications device 401, 402 and a first transmission channel 430a for data transmission from the first to the second communications device 401, 402. The communications devices 401, 402 may be provided at a first and a second outlet 431, 432 of a power wiring system, e.g. an in-house electric power wiring 430. A second transmission channel 430b defines data transmission between the first outlet 431 and a third outlet 433 of the same power wiring system 430. In the first state, a third communications device 403 is connected to the third outlet 433. The third communications device 403 determines channel state information describing the second transmission channel 430b and transmits the channel state information to the first communications device 401.

In one embodiment the channel state information may contain e.g. an elimination identifier identifying the respective outlet as an outlet at which signals shall be extinguished, at least in a certain frequency range. For example, if the third outlet 433 is provided for the connection of an electronic device which is sensitive to electromagnetic radiation within the transmit signal bandwidth, for example a radio broadcast tuner, the elimination identifier may be set. The elimination identifier may also contain information identifying frequency ranges for which extinction is desired.

If the channel state information does not contain the elimination identifier, the first communications device 401 may optionally mark the communication devices accordingly and may select the precode matrix for the second and the third outlets 432, 433 according to a beamforming scheme which ensures a high SNR for signals transmitted from the first 401 to the third communications device 403 and from the first 401 to the second communications device 402. If the channel state information does contain an elimination identifier for the third outlet, the first communications device 401 may mark the third outlet 433 as monitored outlet and may select the precode matrix for the second outlet 432 according to a beamforming scheme which ensures, on the one hand, at the third outlet 433 either a low signal level or a low signal level in selected frequency bands, and a high SNR for signals transmitted from the first 401 to the second communications device 402 on the other hand.

As discussed above, the elimination identifier may be set in the third communications device 403 e.g. if the third outlet 433 is provided for the connection of an electronic device which is sensitive to electromagnetic radiation within the transmit signal bandwidth. The elimination identifier may be set by user interaction, e.g. by means of a switch or via an electric input port. In accordance with another embodiment, the first communications device 401 sets the elimination identifier internally when a specific communications device has been disconnected, e.g. when the third communications device 403 has been disconnected from the third outlet 433. The third communications device 403 might act as a sensor for determining the emitted radiation power at the third outlet 433.

It is also possible to determine the value of the emitted radiation power by checking the channels to other PLC modems in the network. Beamforming codes or angles providing maximal signal level at one or more receiving PLC modems is assumed to cause potentially high signal radiation. Beamforming codes or angles providing minimal signal level at one or more receiving PLC modems are assumed to cause potentially low signal radiation. The variation of signal level at the receiving modem indicates how much energy is lost due to signal radiation. Low levels at receiving modems indicate that the signals are potentially attenuated by connected devices (AC power consumers). If signals are attenuated, it is assumed that further emitted radiation is low.

Alternatively, a common mode current probe 200 might be used as a sensor adapted to determine the emitted radiation power at a location in a mains grid of the power line communications system. The current probe measures a common mode current in the wires. Since the common mode current results in emitted radiation, a value of the common mode current provides a possibility to estimate the emitted radiation power. The common mode current probe 200 might be located at any location in the grid or close to the transmitting device 401 and is connected to the transmitting device 401 via a communication channel, so that the precoding matrix in the precoder unit 116 and the amplifier 118 can adjust the emitted radiation power at the location of the common mode current probe to the predetermined radiation power level.

Alternatively or in addition, an antenna or level meter 204 might be used as a sensor adapted to determine the emitted radiation power in a mains grid or even outside of a building. The measurements of the antenna 204 are used by the precoding matrix in the precoder unit 116 and the amplifier 118 to adjust the emitted radiation power at the location of the antenna 204 to the predetermined radiation power level.

Figure 2B:
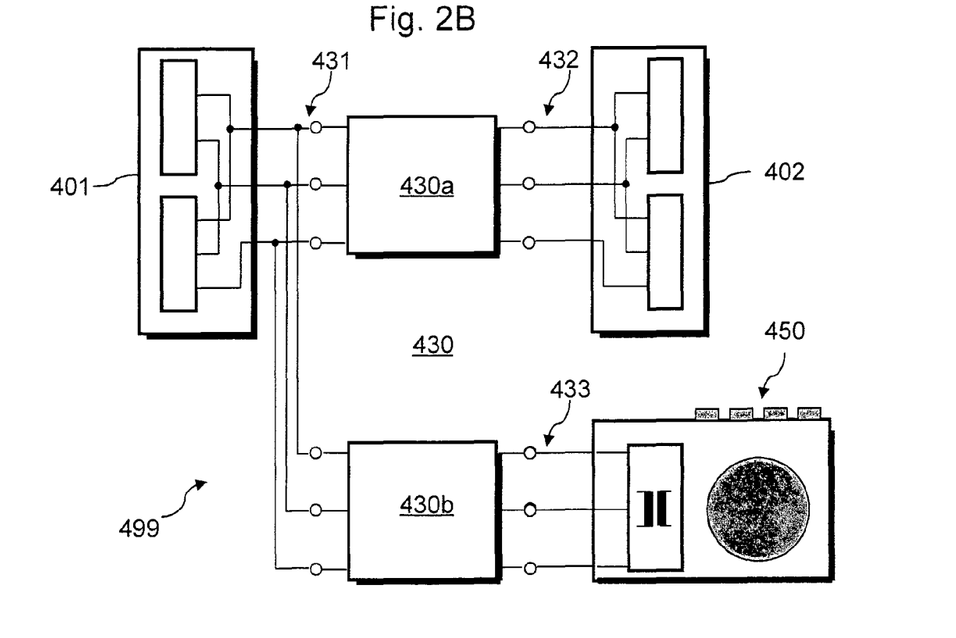
FIG. 2B is a schematic block diagram illustrating the MIMO communications system of FIG. 2A in a second state in which the temporarily connected communications device is replaced with a consumer application device.

FIG. 2B shows the communications system 400 of FIG. 4A in a second state after the third communications device 403 has been disconnected from the power wiring system 430 and after a radio receiver 450 has been connected to the third outlet 433. If the first communications device 401 precodes the signals transmitted to the second communications device 402 such that selected frequency bands at the third outlet are suppressed, the radio receiver may receive broadcast signals without interference caused by the communications system 400.

Figure 3:
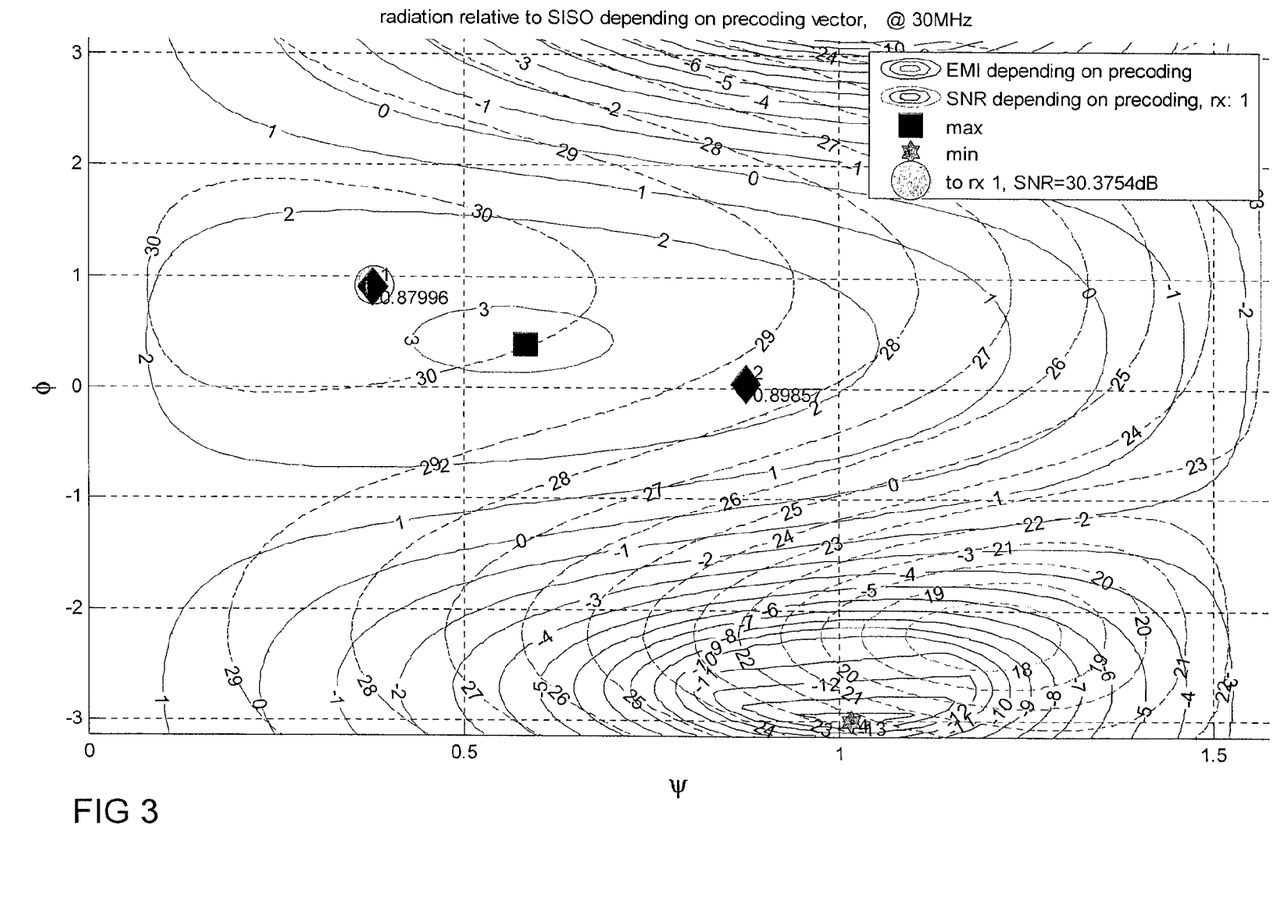
FIG. 3 illustrates the electromagnetic interference (EMI) and the signal-to-noise ratio (SNR) depending on different precoding procedures in an indoor environment.

FIG. 3 shows an example of the EMI of an electrical field in the air (E-field), radiated from the power lines during MIMO PLC communication. The E-field was measured with an antenna. The field depends on the precoding vector (solid contour lines). The level of the E-field is shown relative to the E-field of a SISO power line communications radiation at 30 MHz. The antenna was located indoor. The precoding vector can be described by the two parameters ψ (psi, x-axis, between 0 and pi/2) and 1 (phi, y-axis, between −pi and pi). The highest increase of radiation (+3 dB compared to SISO) is obtained by the precoding vector marked with the black square, the maximal signal elimination (maximal reduction compared to the SISO transmission's E-field, −14 dB) is obtained by the precoding vector marked with the gray star. The communication links to other outlets in the building were also measured for the feeding outlet where the EMI measurements were performed. Two links were available in this example. The optimum (Spot Beamforming) precoding vector to these two receiving outlets with regard to signal-to-noise ratio is marked by the two diamonds labeled by 1 and 2. The available SNR of the first link depending on the precoding vector is shown by the dashed contour lines in FIG. 3. The highest SNR of 30 dB (see the circle in FIG. 1) is achieved if the precoding vector is optimized for this link. The SNR decreases when 'moving away' from this optimum precoding. The precoding vector optimized for the communication link and the precoding vector optimized to reduce EMI are usually not identical. The example shown in FIG. 3 provides quite some distance between the two vectors: The subscript number (0.88) at the first diamond symbol indicates a measure of the distance to the optimum precoding vector to minimize EMI. This distance might vary between 0 (same precoding vector) and 1 (most distant precoding vector or orthogonal vector).

For the following discussion it is assumed that the precoding vector is optimized to achieve elimination of the E-field at the location of the antenna (star symbol in FIG. 3). The radiated E-field is 16 dB (2-(−14 dB)) below the radiation compared to the case where the precoding vector is used which is optimized for this link. Consequently, the transmit power level may be increased by this amount to obtain the same EMI potential at the location of the antenna. On the other hand, the SNR loss by not using the optimum precoding vector for this link is 8 dB (30 dB-22 dB), as observed by the intersection of the dashed contour lines with the star symbol. Overall, by using a precoding vector optimized for E-field elimination and the the same time increasing the transmit power level an SNR increase of 8 dB might be obtained in this example which results in an increased bitrate.

Figure 4:
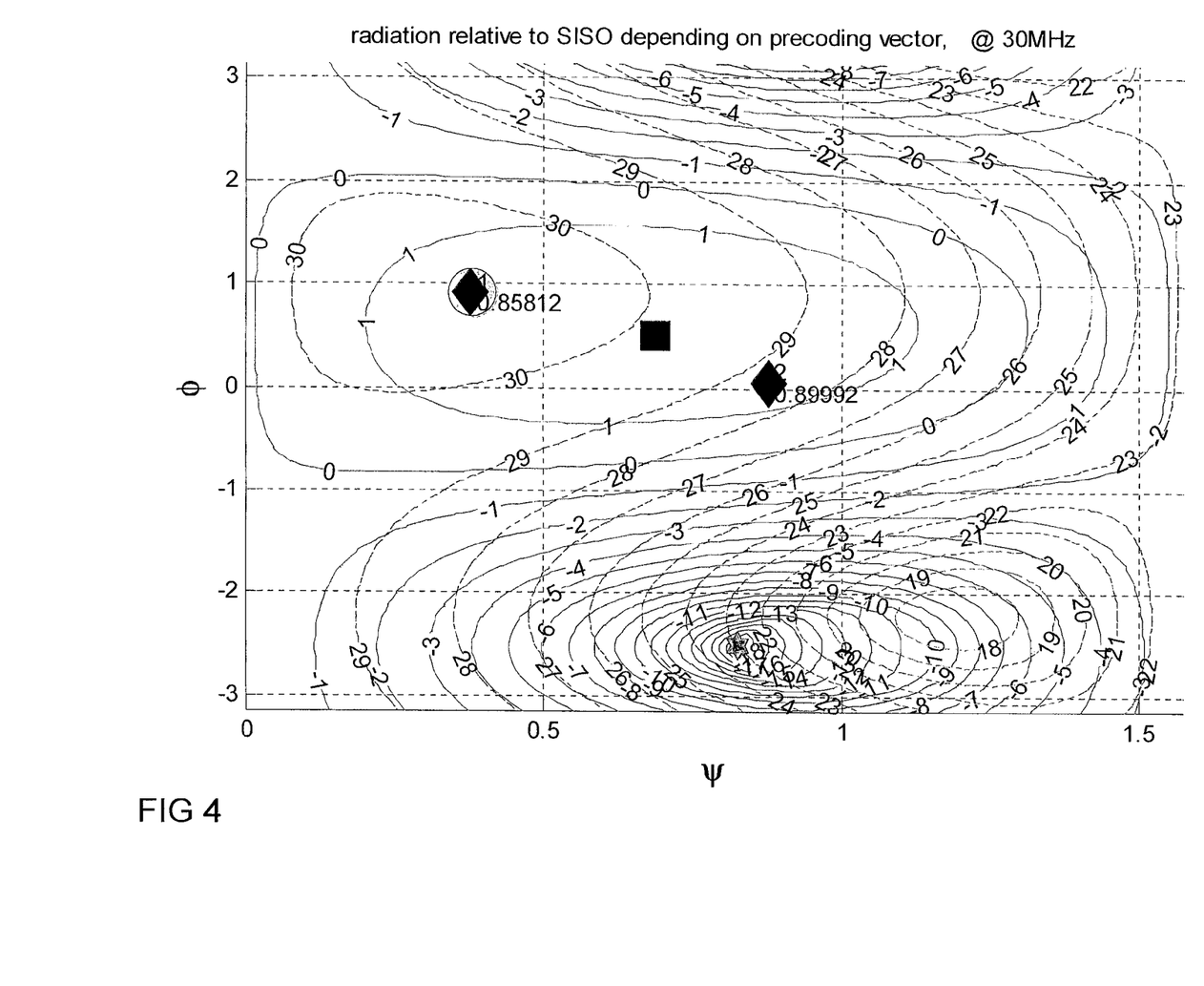
FIG. 4 illustrates the electromagnetic interference (EMI) and the signal-to-noise ratio (SNR) depending on different precoding matrices measured at a first outdoor antenna location.
Figure 5:
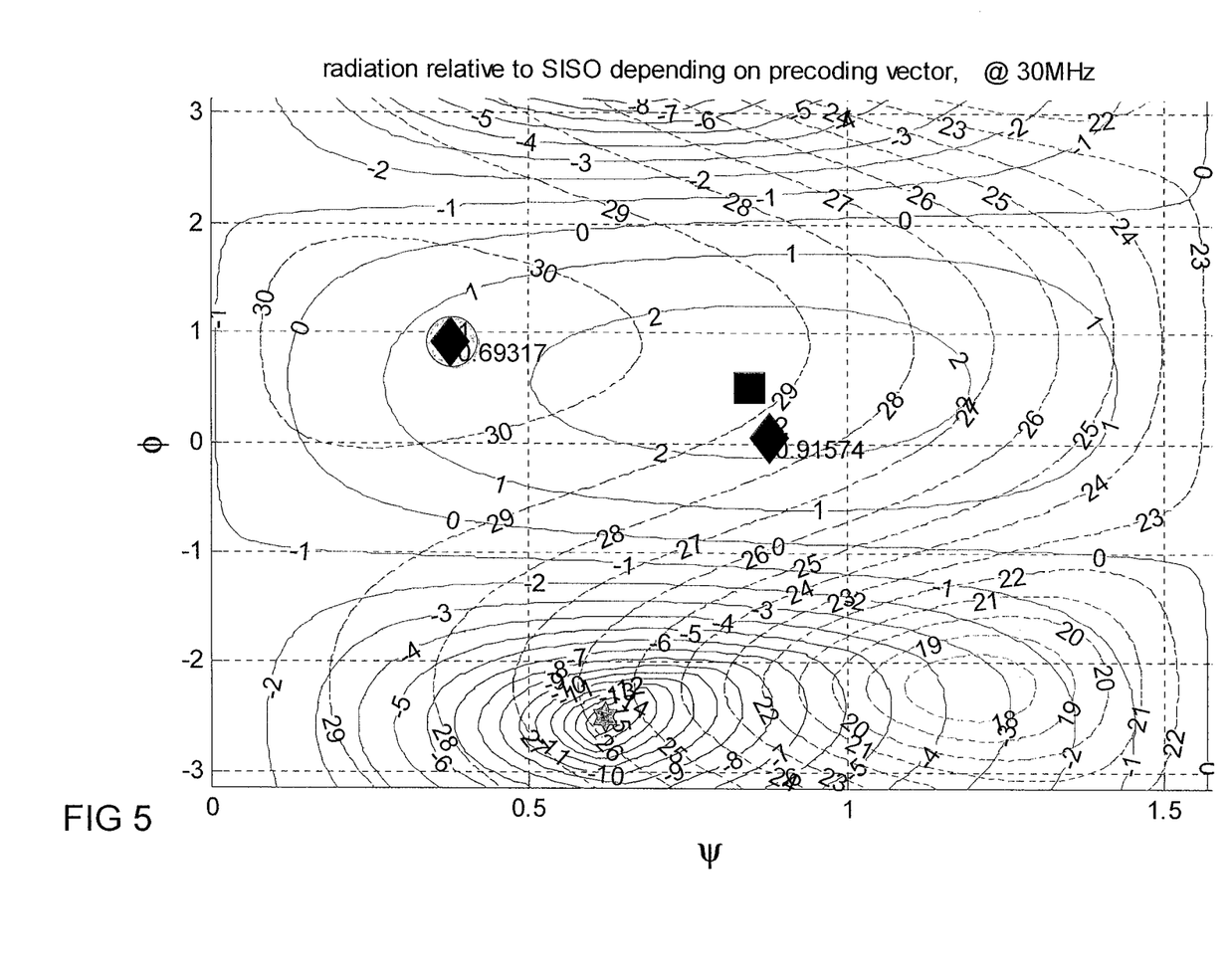
FIG. 5 illustrates the electromagnetic interference (EMI) and the signal-to-noise ratio (SNR) depending on different precoding matrices measured at a second outdoor antenna location.

FIGS. 4 and 5 show similar plots as FIG. 3, for the same transmitting outlet location and building and two different antenna locations at a 10 m distance outdoor from the exterior wall of the building. The EMI contour lines are quite similar to FIG. 3 (the EMI maximum is in the figures center and the minimum precoding vector can be found centralized, but close to the bottom line). This indicates that the EMI optimized precoding is almost independent of the antenna location.

In certain countries (e.g. in the United States of America) the assessment of the PLC product certification is done by checking the electrical field level in the outside of a building. If this level is lowered by e.g. 10 dB by smart beamforming, the Transmit level of PLC modems might be increased by this 10 dB.

Figure 6:
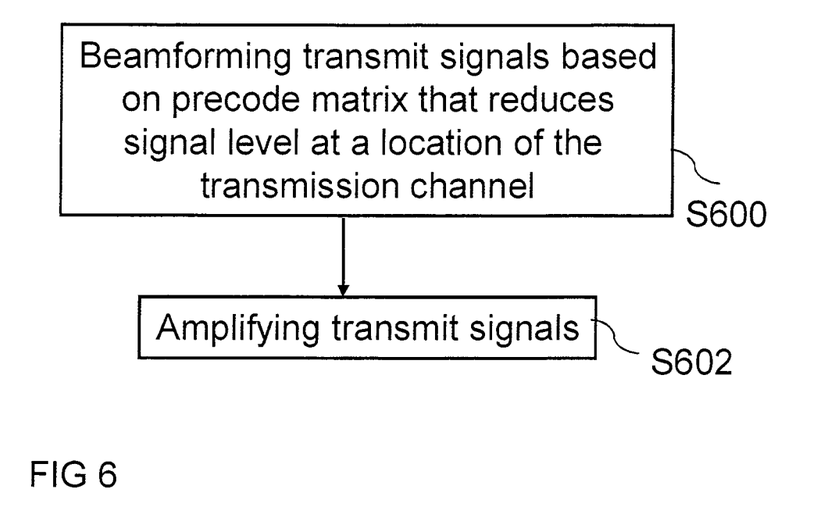
FIG. 6 is a schematic flow diagram of a method according to an embodiment of the disclosure.

In FIG. 6 a schematic flow diagram of a method for transmitting at least two parallel transmit signals via a transmission channel according to an embodiment of the disclosureis depicted.

In a step S600 the at least two transmit signals are beamformed based on a precoding matrix that reduces emitted radiation power at at least one location in an area of the transmission channel.

In a step S602 at least one of the at least two transmit signals is amplified to a value that results in an emitted radiation power at the at least one location that is below a predetermined radiation level.

With this method it is possible to increase a feeding power level of a communications device, e.g. a PLC modem, while fulfilling EMI regulations that are reflected by an allowed predetermined radiation level at certain (predefined) locations in the area of the transmission channel, e.g. wires as power line communication channels.

The channel capacity of a beamforming MIMO PLC transmission optimized on maximum data throughput can in one embodiment be calculated using the following formula for Eigenbeamforming:

$$C_{Max\_Data} = \frac{B}{N} \sum_{i=1}^{N} \sum_{\mu=1}^{2} \log_2\left(1 + \frac{\lambda_{i,\mu} E_S}{n_T N_0}\right) \text{bit/s}$$

with:
B: Channel bandwidth
N: number of OFDM subbands (or carriers)
i: subcarrier index
μ: MIMO stream index
$\lambda_{i,\mu}$: eigenvalues of the 'squared' channel matrix (depending on the channel matrix and precoding)
$E_s$: total average tx energy
$n_T$: number of tx paths
$N_0$: noise power level The channel capacity of a beamforming MIMO PLC transmission optimized on minimal radiation or interference level can in one embodiment be calculated using the following formula for Spotbeamforming:

$$C_{opt\_EMI} = \frac{B}{N} \sum_{i=1}^{N} \log_2\left(1 + \frac{\lambda_{i,1}(E_S + EP)}{n_T N_0}\right) \text{bit/s}$$

with:
B: Channel bandwidth
N: number of OFDM subbands (or carriers)
i: subcarrier index
$\lambda_{i,1}$: are the eigenvalues of the 'squared' channel matrix (depending on the channel matrix and precoding)
$E_s$: total average tx energy
EP: Extra feeding power due to boosting transmit level by the value of reduced interference
$n_T$: numhpr of tx paths
$N_0$: noise power level The channel capacities optimized on maximum data throughput $C_{Max\_Data}$ and optimized on minimal radiation $C_{opt\_EMI}$ may in one embodiment be compared and the larger one might be chosen.

Alternatively to the capacity calculation above, the resulting SNR might be used which may be impaired by implementation limits (channel estimation, equalizer ... ). Assume, V is the optimum precoding matrix for Eigen-Beamforming with two streams and ES is the transmit power level. The SNR of the two streams is given by $$SNR_{1,maxData}(V,ES) \text{ and } SNR_{2,maxData}(V,ES)$$

In case Spot-Beamforming is used, only one spatial stream is available. The first column of the precoding matrix V may be used in this case which gives the precoding vector v.

Assume $V_{optEMI}$ is the precoding vector that minimizes EMI. The transmit power could be increased now by the amount EP to obtain the same EMI. The resulting SNR is given by $$SNR_{1,optEMI}(V_{optEMI}, ES+EP)$$

Both signal to noise ratios SNR may be compared and the SNR which results in a higher throughput may be chosen.

Obviously, numerous modifications and variations of the present disclosure are possible in light of the above teachings. It is therefore to be understood that within the scope of the appended claims, the disclosure may be practiced otherwise than as specifically described herein.

The present application claims priority to European Patent Application 12 007 094.1 filed in the European Patent Office on Oct. 12, 2012, the entire contents of which is incorporated herein by reference.

The invention claimed is:

1. A communications device comprising:
a transmitter configured to transmit at least two transmit signals via a transmission channel;
a precoder configured to beamform the transmit signals based on a precode matrix that is adapted to reduce a signal level at at least one location in an area of the transmission channel;
an amplifier adapted to amplify at least one of the transmit signals to a value that results in the signal level at the at least one location that is below a predetermined signal level; and
a sensor configured to check channel characteristics of receiving devices connected to the transmission channel and evaluate the signal level based on comparing channel characteristics for minimum and maximum signal levels at other devices.

2. The communications device according to claim 1, wherein the signal level is emitted radiation power.

3. The communications device according to claim 1, wherein the signal level is interfering noise level at any location on a mains grid.

4. The communications device according to claim 1, wherein a power line communications system provides the transmission channel.

5. The communications device according to claim 4, wherein the area is part of the power line communications system.

6. The communications device according to claim 4, wherein the area is surrounding the power line communications system.

7. The communications device according to claim 1, further comprising
a precoder controller configured to determine the precode matrix based on feedback information provided to the precoder controller by a sensor determining an emitted radiation power at the location.

8. The communications device according to claim 1, further comprising
a processor adapted to select a beamforming method from a beamforming method optimized on data throughput and a beamforming method optimized on minimal interferences and boosting a transmission level.

9. The communications device according to claim 1, wherein the amplifier is adapted to amplify the signal level by an amount which corresponds to or is less than a reduction of the signal level at the location caused by the precoding, or corresponds to or is less than a signal level specified by a regulation minus the reduced signal level, or the smaller of both.

10. A communications system comprising
a communications device according to claim 1;
a sensor configured to determine an emitted radiation power at the location; and
a communication channel connecting the sensor to the communications device.

11. A method for transmitting at least two transmit signals via a transmission channel, comprising:
beamforming the at least two transmit signals based on a precode matrix that reduces a signal level at at least one location in an area of transmission channel;
amplifying at least one of the transmit signals to a value that results in the signal level at the at least one location that is below a predetermined signal level;
checking channel characteristics of receiving devices connected to the transmission channel; and
evaluating the signal level based on comparing channel characteristics for minimum and maximum signal levels at other devices.

12. The method according to claim 11, wherein a power line communications system provides the transmission channel.

13. The method according to claim 12, wherein the area is part of the power line communications system.

14. The method according to claim 12, wherein the area is surrounding the power line communications system.

15. The method according to claim 11, wherein the determining further includes:
placing a sensor at the location; and
determining communication channel characteristics to the location for different precode matrices.

16. The method according to claim 12, wherein the determining further includes:
 measuring common mode currents in sensors located in a mains grid of the power line communications system; and
 estimating the signal level based on the common mode currents.

\* \* \* \* \*